United States Patent [19]

Nozawa et al.

[11] Patent Number: 4,486,741
[45] Date of Patent: Dec. 4, 1984

[54] MANUAL DATA INPUT DEVICE FOR A NUMERICAL CONTROL APPARATUS

[75] Inventors: Ryoichiro Nozawa, Tokyo; Nobuyuki Kiya, Hachioji, both of Japan

[73] Assignee: Fujitsu Fanuc Limited, Tokyo, Japan

[21] Appl. No.: 255,256

[22] Filed: Apr. 17, 1981

[30] Foreign Application Priority Data

Apr. 30, 1980 [JP] Japan ............................ 55-59598[U]

[51] Int. Cl.³ .............................................. G06F 3/02
[52] U.S. Cl. ............................ 340/365 R; 340/365 S; 364/709; 400/485
[58] Field of Search ............ 340/365 R, 365 S, 323 R, 340/825.19; 364/709, 513; 273/260, 1 E, 237; 400/485, 87

[56] References Cited

U.S. PATENT DOCUMENTS 3,831,147  8/1974  Kafafian ............................ 400/87
4,235,442  11/1980  Nelson ............................ 273/237

FOREIGN PATENT DOCUMENTS 2800293  7/1979  Fed. Rep. of Germany .
3012480  10/1981  Fed. Rep. of Germany .

OTHER PUBLICATIONS

*IBM Technical Disclosure Bulletin,* Bantz et al., vol. 21, No. 9, Feb. 1979, pp. 3845–3846.
*IBM Technical Disclosure Bulletin,* Emmons et al., vol. 22, No. 12, May 1980, p. 5455.

*Primary Examiner*—James J. Groody
*Attorney, Agent, or Firm*—Staas & Halsey

[57] ABSTRACT

A data input device equipped with a keyboard including a plurality of keys at least some of which are assigned both a letter of the alphabet and a numerical value, which keys are operated to generate signals representing data that comprises a letter of the alphabet and numerical values immediately following the letter. The initial operation of one of the keys produces the data indicated by the letter of the alphabet assigned to that key, and subsequent operation of the keys produces the data indicated by the numerical values assigned to the keys that have been operated.

7 Claims, 4 Drawing Figures

MANUAL DATA INPUT DEVICE FOR A NUMERICAL CONTROL APPARATUS

BACKGROUND OF THE INVENTION

This invention relates to a data input device and, more particularly, to a data Input Device well suited for use as a manual data input device (MDI) in a numerical control apparatus.

Various electronic devices such as electronic cash registers generally have keyboard means comprising a number of keys which are depressed to input the desired data. The keyboard includes keys for entering letters of the alphabet to identify the category of the input data, for entering numerical values, and for entering a variety of symbols such as period and asterisk symbols. Each key is divided into upper and lower stages, with either a numerical value or symbol being assigned to the upper stage and a letter of the alphabet being assigned to the lower stage. Separately provided is a shift key that is depressed to select the upper stage and then released to restore the lower stage. If the upper stage has been selected, depressing one of the keys will enter the numerical value or the symbol assigned to the upper stage of that key. Depressing the same key will, however, enter the letter of the alphabet assigned to the lower stage of the key if the lower stage has been selected by the shift key.

The provision of the shift key thus enables more than one item of information to be entered by a single key. For example, as described above, one key can enter a letter of the alphabet and either a numerical value or a symbol. This permits a reduction in the number of keys and in the size and cost of the apparatus.

Various machine tools and robots now come equipped with numerical control devices that incorporate a manual data input device (MDI). Operating the keyboard of the MDI allows one to enter the numerical control data manually and to correct, delete from and add to the machining data stored in the memory of the numerical control device. Keys of the data input keyboard provided on the MDI are, like the cash register described above, divided into an upper stage for a numerical value or for a symbol and a lower stage for a letter of the alphabet. A separate shift key is employed to select the upper stage or lower stage. Depressing one of the above-mentioned keys following the selection of the upper stage allows the operator to enter the numerical value or the symbol assigned to the upper stage of that key, whereas depressing the key following the selection of the lower stage permits the operator to enter the letter of the alphabet assigned to the lower stage of that key. Thus the advantages offered are the same as those described in connection with the cash register.

With the keyboard devices of the type described, however, an operator unfamiliar with the key-in operation may forget to use the shift key or may not operate it correctly. The result would be an input of incorrect data and a concomitant reduction in the data input speed arising from the need to correct the input errors.

SUMMARY OF THE INVENTION

Accordingly, an object of the present invention is to provide a novel data input device which does not require a shift key but which nevertheless allows a single key to enter two items of data.

Another object of the present invention is to provide a data input device which does not require the use of a shift key when entering a numerical value or symbol immediately following an address, but which nevertheless allows a single key to enter two items of data.

In accordance with the present invention, there is provided a data input device comprising a keyboard including a plurality of keys at least some of which are assigned both a letter of the alphabet and a numerical value, which keys are operated to generate signals representing data that comprises a letter of the alphabet and numerical values immediately following the letter. In addition, an encoder is included for encoding the signals generated by the operated keys thereby producing encoded data representing the letter of the alphabet and the numerical values. The first operation of one of the keys causes the encoder to encode and deliver the signal representing the letter of the alphabet assigned to the key, and then causing the encoder to switch over to a mode for encoding and delivering the signals representing the numerical value data generated by subsequent operation of the keys.

Further, there is provided a data input device comprising a keyboard including a plurality of keys at least some of which are assigned both a letter of the alphabet and a numerical value, which keys are operated to generate signals representing data that comprises a letter of the alphabet and numerical values immediately following the letter. Also included is an encoder for encoding the signals generated by the operated keys thereby producing encoded data representing the letter of the alphabet and the numerical values and a data input key for inputting the data comprising the letter of the alphabet and numerical values. Further included is a changeover circuit which is set by the data input key for placing the encoder in a mode for encoding and delivering a signal representing a letter of the alphabet and a gate circuit for resetting the changeover circuit by an AND signal between a set signal from the changeover circuit and a key signal; thereby placing the encoder in a mode for encoding and delivering signals representing numerical value data. The first operation of one of the keys causes the encoder to encode and deliver the signal representing the letter of the alphabet assigned to the key, and then to switch over to a mode for encoding and delivering the signals representing the numerical value data generated by subsequent operation of the keys.

Still further, there is provided a data input device comprising a keyboard including a plurality of keys at least some of which are assigned a letter of the alphabet and a numerical value, which keys are operated to generate signals representing data that comprises a letter of the alphabet and numerical values immediately following the letter. Also included is an encoder for encoding the signals generated by the operated keys thereby producing encoded data representing the letter of the alphabet and the numerical values and a data input key for inputting the data comprising the letter of the alphabet and numerical values. Further included is a changeover circuit which is set by the data input key for placing the encoder in a mode for encoding and delivering a signal representing a letter of the alphabet and a gate circuit for resetting the changeover circuit by an AND signal between a set signal from the changeover circuit and a key signal, thereby placing the encoder in a mode for encoding and delivering signals representing numerical value data. Additionally included is memory means for temporarily storing the encoded data delivered by the encoder. The first operation of one of the keys causes the encoder to encode and deliver the signal representing the letter of the alphabet assigned to the key, and then causes the encoder to switch over to a mode for encoding and delivering the signals representing the numerical value data generated by subsequent operation of the keys, the operation of the data input key setting the changeover circuit, whereby the memory means delivers the data stored therein.

Other features and advantages of the invention will be apparent from the following description taken in connection with the accompanying drawings.

DESCRIPTION OF THE PREFERRED EMBODIMENT

Figure 1:
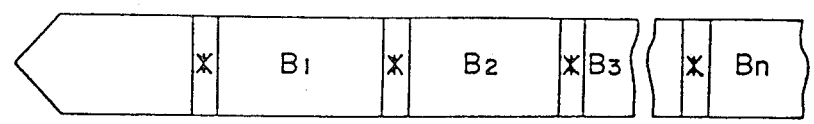
FIG. 1 is a diagram showing the structure of a machining program for numerical control data.
Figure 2:
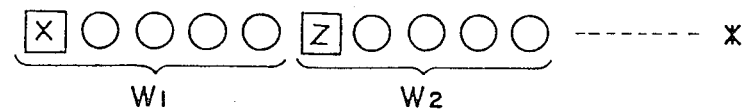
FIG. 2 is a diagram showing the structure of words included in the machining program.

Numerical control data or data for entry into a cash register consists of addresses composed of the letters of the alphabet, and numerical values which immediately follow the addresses. In the case of a machining program of a numerical control device, for example, the program is composed of a number of instructions, each instruction unit being referred to as a block. The blocks constituting the program shown in FIG. 1 are denoted by $B_1$, $B_2$, $B_3$, ..., $B_n$. The end of each block is indicated by an asterisk (*) representing an end-of-block code that is used to separate one instruction unit or block from the adjacent ones. Each block is composed of words $W_1$, $W_2$, ..., as shown in FIG. 2. Each word is in turn composed of an address comprising a single letter of the alphabet, and a numerical value or values immediately following the address language. By way of example, a word for a "move" instruction would comprise an address X, Z, U or W giving the direction of movement, and numerical values, which give the distance to be moved, immediately following the address. Thus, such an instruction would take the form X OOO ... O for movement in the direction of the X-axis. Similarly, feed rate data would comprise an address F and numerical values indicative of the feed rate. Words for M (miscellaneous), S (spindle) and T (tool) function commands possessed by a numerical control device would also comprise the respective addresses M, S, T followed by numerical values, and a word for a G (preparatory) function command would comprise the address G followed by numerical values. Moreover, each block includes at least one word of data. Corrections or additions to the machining program can be effected by supplying the numerical control device with word unit data entered from the keyboard.

It is obvious from FIG. 2 that no word in a block has two or more contiguous addresses and that each address contains just a single letter of the alphabet. The present invention makes use of this fact to provide a data input device that need not rely upon a shift key, as will now be described with reference to FIGS. 3 and 4.

Figure 3:
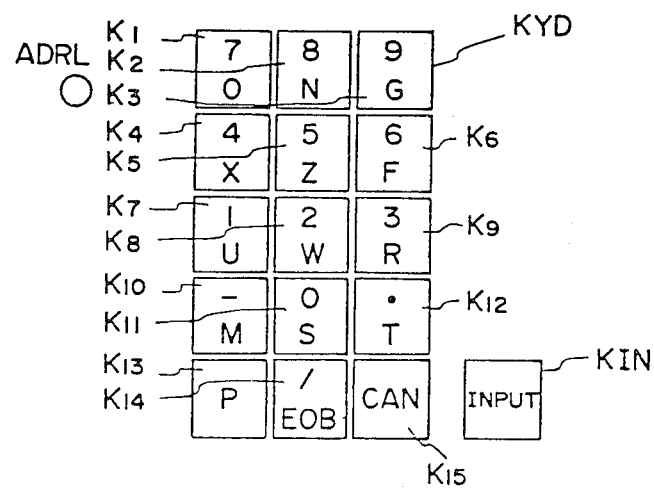
FIG. 3 is a front view showing the principal portion of a keyboard which is part of a manual data input device.
Figure 4:
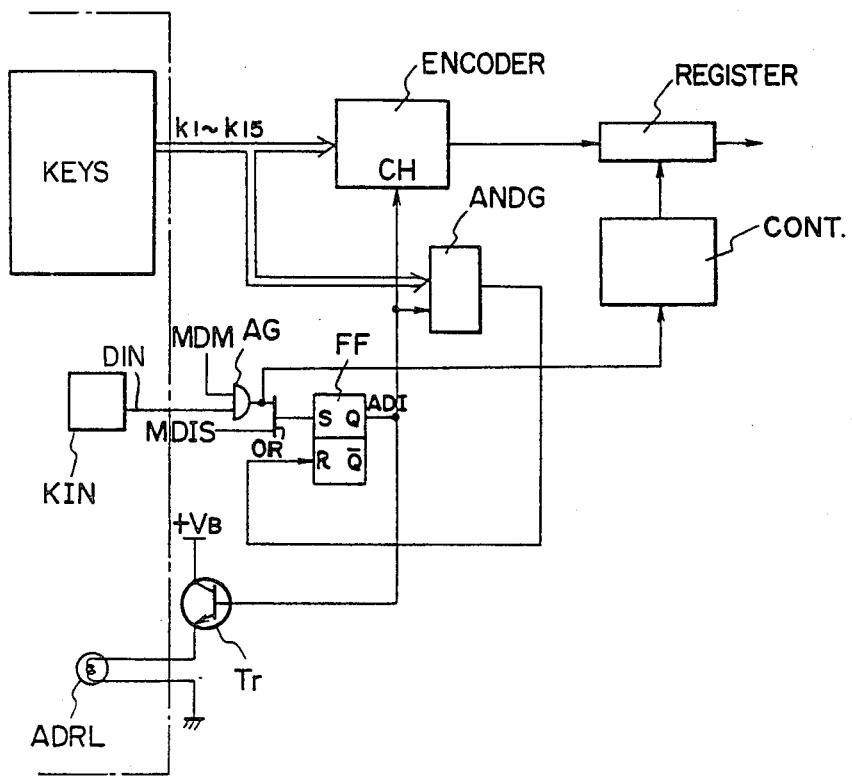
FIG. 4 is a block diagram of the principal control circuitry for the manual data input device.

FIGS. 3 and 4 are useful in describing how the data input device of the present invention may be applied to a numerical control device. Specifically, FIG. 3 is a front view showing the principal portion of a manual data input MDI keyboard, and FIG. 4 is a block diagram illustrating the principal control circuitry for the MDI. Referring first to FIG. 3, KYD denotes a group of keys for entering single-letter addresses, numerical values and the end-of-block code EOB, which is represented by the asterisk (*) in FIGS. 1 and 2. Fifteen keys $K_1$ through $K_{15}$ comprise the key group KYD. Each of the keys $K_1$ through $K_{12}$ is divided into an upper stage that is assigned a numerical value or symbol, and a lower stage that is assigned a letter of the alphabet. Key $K_{14}$ is similarly divided, with a slash mark "/" being assigned to the upper stage, and the end-of-block code "EOB" to the lower stage. Key $K_{13}$ is for entering the address P, and key $K_{15}$ is a cancel key. The numerical control data for a machining program or the like, which has been entered by operating the key group KYD, is stored temporarily in a register RG that will be described later in connection with FIG. 4. KIN denotes an input key for writing this data into a memory incorporated within the numerical control device (not shown). An address lamp ADRL lights when the address portion of a word is capable of being entered.

Signals $K_1$ through $K_{15}$ indicative of the letters, numerical values and symbols entered by the corresponding keys $K_1$ through $K_{15}$ of the key group KYD are delivered for encoding to an encoder EN, as shown in FIG. 4. The encoder EN has a changeover terminal CH whose logic level will be either "1" or "0", as will be described below. If the terminal CH is at logical "1" when a signal from the keyboard arrives, the encoder EN delivers the data, in encoded form, assigned to the lower stage of the key depressed; if at logical "0", the encoder output is the encoded data assigned to the upper stage of the key depressed. A register RG temporarily stores the encoded data, delivered by the encoder EN. An AND gate AG receives a signal MDM indicative of the state of the manual data input mode, and a signal DIN (data input signal) indicative of the state of the input key KIN. An OR gate OR delivers a "1" when the input key KIN is depressed (DIN=1) with the numerical control device in the manual data input mode (MDM=1), or when the numerical control device is switched over to the manual data input mode (MDIS=1) from the automatic mode. A flip-flop FF is set by the "1" logic from the OR gate OR, and reset by "1" logic from a gate circuit ANDG that will be described below. The Q output ADI of the flip-flop FF is connected to the changeover terminal CH of the encoder EN, to the input side of the gate circuit ANDG; and to a transistor Tr whose function will be described below. Accordingly, in a manner to be described later, depressing any of the keys $K_1$ through $K_{12}$ or the key $K_{14}$ causes the letter of the alphabet or the code EOB assigned to the lower stage of the depressed key to be delivered to the register RG when the flip-flop FF is in the set state. When the flip-flop is in the reset state, on the other hand, operating a key causes the data (such as one of the numerical values of from 0 to 9) assigned to the upper stage of that key to be delivered to the register RG. A control circuit CONT is operable to transfer the content of the register RG to a memory (not shown) when the data input key KIN is depressed.

The data input device of the present invention operates in the following manner. When a mode changeover switch (not shown) is set to the MDI function to place the numerical control device in the manual data input mode (where the conventional signal MDM equals 1 as long as the device is in the manual data input mode and returns to "0" when the device is switched out of the manual data input mode), the conventional signal MDIS goes to logical "1"0 momentarily to set the flip-flop FF whose Q output ADI goes to logical "1" and MDIS returns to "0" thereafter. This signal is delivered to the CH terminal of the encoder EN, to the transistor Tr, and to the gate circuit ANDG. The "1" logic at the terminal CH of the encoder establishes an address input state. In other words, when a key-in signal arrives from the key group KYD with the "1" logic at the terminal CH, the encoder EN converts the key-in signal into an alphabetic code, and the "1" logic of the signal ADI causes the transistor Tr to conduct in order to light the address lamp ADRL. This tells the operator that the numerical control device is ready to receive an address. By way of example, assume that any one of the keys $K_1$-$K_{14}$ is depressed with the "1" logic at the terminal CH of the encoder EN. Let the depressed key be the key $K_4$. This will send a key-in signal $K_4$ (logical "1") to the encoder that responds by delivering an encoded signal representing the letter of the alphabet "X" assigned to the lower stage of the key $K_4$. The encoded signal is applied to the register RG where it is stored. The key-in signal $K_4$ is also sent to the gate circuit ANDG. Since the inputs ADI and $K_4$ sent to the gate circuit ANDG are both at logical "1", the output of the gate circuit is a "1" and that resets the flip-flop FF, with the Q output ADI thereof returning to logical "0". This establishes the numerical value or symbol input state and cuts off the transistor Tr to extinguish the lamp ADRL. In other words, with the encoder in the address input state (ADI=1), depressing any one of the keys $K_1$ through $K_{15}$ resets the flip-flop FF to terminate the address input state and establish the numerical value or symbol input state (ADI=0). Then, when any of the keys $K_1$-$K_{12}$, $K_{14}$ is subsequently depressed, the numerical value or symbol assigned to the upper stage of that key is encoded by the encoder EN and then stored in the register RG. The numerical value or symbol key-in operation may be repeated as often as necessary to successively store the encoded numerical value or symbol data in the register. After all of the prescribed numerical control data in the form X OO . . . O (i.e., the address and the numerical values and/or symbols) has been entered by operating the key group KYD, depressing the data input key KIN sends the signal DIN to logical "1". The control circuit CONT receives the "1" logic and causes the register RG to transfer the stored numerical control data X OO . . . O to the memory of the numerical control device, which is not shown in the drawings. The output of the OR gate goes to logical "1" at the same time that the data input key is depressed, this being the result of the change in the logical state of the signal DIN. The "1" logic at the output of the OR gate sets the flip-flop FF, thereby restoring it to its initial state. This completes the input of one word of numerical control data. Inputting data by repeating the above operation permits the entry of numerical control data in the form of a series of words or blocks.

The present invention as described above makes it possible to dispense with a shift key or with a key equivalent to a shift key regardless of the fact that single keys on the keyboard are assigned both letters and numerical values or symbols. This permits an inexperienced operator to input addresses, numerical values and symbols without relying upon a shift key to select the upper or lower stage of a key. The result is fewer errors as well as a reduction in cost that is achieved by reducing the number of keys.

The embodiment described above is not restrictive, for it is obvious that the present invention can be applied to data input devices on cash registers, measuring instruments and other devices that require the entry of data comprising a combination of an address of a single letter and numerical values.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A data input device comprising:
    a keyboard including a plurality of keys at least some of which are assigned both a letter of the alphabet and a numerical value, which keys are operable to generate key signals representing data that comprises a letter of the alphabet and numerical values immediately following said letter;
    an encoder, operatively connected to said keyboard and having first and second modes, for encoding said key signals generated by the operated keys to generate encoded data representing one of said letter of the alphabet and said numerical values in dependence upon the mode of said encoder;
    a data input key for inputting said encoded data comprising the letter of the alphabet and numerical values;
    a changeover circuit, operatively connected to said data input key and said encoder, which is set by said data input key, for placing said encoder in the first mode being for encoding the key signal and outputting encoded data representing a letter of the alphabet and for generating a set signal; and
    a gate circuit, operatively connected to said changeover circuit and to said keyboard, for resetting said changeover circuit by generating an AND signal between the set signal from said changeover circuit and a first of the key signals, thereby placing said encoder in the second mode being for encoding and outputting encoded data representing the numerical value data, the first operation of one of said keys causing said encoder to encode the key signal and output the encoded data representing the letter of the alphabet assigned to said key, and then to switch over to the second mode for encoding the key signal and outputting the encoded data representing the numerical value data generated by subsequent operation of said keys.

2. A data input device according to claim 1, wherein said changeover circuit comprises a flip-flop circuit operatively connected to said encoder, said data input key and said gate circuit.

3. A data input device according to claim 1, further comprising an indicator actuated by the set signal from said changeover circuit for indicating that a letter of the alphabet has been input.

4. A data input device comprising:
    a keyboard including a plurality of keys at least some of which are assigned both a letter of the alphabet and a numerical value, which keys are operable to generate key signals representing data that comprises a letter of the alphabet and numerical values immediately following said letter;

an encoder, operatively connected to said keyboard and having first and second modes, for encoding said key signals generated by the operated keys to generate encoded data representing one of said letter of the alphabet and said numerical values in dependence upon the mode of said encoder;

a data input key for inputting said encoded data comprising the letter of the alphabet and numerical values;

a changeover circuit, operatively connected to said data input key and said encoder, which is set by said data input key, for placing said encoder in the first mode being for encoding the key signal and outputting the encoded data representing a letter of the alphabet and for generating a set signal;

a gate circuit, operatively connected to said changeover circuit and said keyboard, for resetting said changeover circuit by generating an AND signal between the set signal from said changeover circuit and a first of the key signals thereby placing said encoder in the second mode being for encoding the key signal and outputting encoded data representing numerical value data; and memory means, operatively connected to said encoder, for temporarily storing the encoded data output by said encoder, the first operation of one of said keys causing said encoder to encode the key signal and output the encoded data representing the letter of the alphabet assigned to said key, and then to switch over to the second mode for encoding the key signal and outputting the encoded data representing the numerical value data generated by subsequent operation of said keys, the operation of said data input key setting said changeover circuit, whereby said memory means delivers the data stored therein.

5. A data input device, comprising:

a keyboard including a plurality of keys at least some of which are assigned both a letter of the alphabet and a numerical value, which keys are operable to generate key signals representing data that comprises a letter of the alphabet and numerical values immediately following the letter;

mode selection means for selecting a manual data input mode;

memory means for storing information indicating whether said device is in an alphabet input state or in a numerical value input state;

an encoder, operatively connected to said keyboard, for encoding the key signals generated by the operated keys to generate encoded data representing the one of the letters of the alphabet and the numerical values in dependence upon the alphabet input state or the numerical value input state;

a data input key operated for inputting the encoded data comprising the letter of the alphabet and numerical values;

first means for placing said memory means in the alphabet input state at the moment when the manual data input mode is selected and the data input key is operated; and second means for placing said memory means in the numerical value input state in dependence upon the generation of one of the key signals when said device is in the alphabet input state.

6. A data input device according to claim 5, wherein said memory means is a flip-flop circuit, operatively connected to said encoder, said first means and said second means, for generating a set signal.

7. A data input device according to claim 6, further comprising an indicator, actuated by the set signal from said flip-flop circuit, for indicating that a letter of the alphabet has been input.

* * * * *

UNITED STATES PATENT AND TRADEMARK OFFICE
CERTIFICATE OF CORRECTION

PATENT NO. : 4,486,741

DATED : December 4, 1984

INVENTOR(S) : Nozawa, et al.

It is certified that error appears in the above-identified patent and that said Letters Patent is hereby corrected as shown below:

Title page (56) Insert

-- Fanuc System 6T Operators Manual, 1/1980, pp. 177-179, 196 and 208-209 .... 340/365R --.

Signed and Sealed this

Eighth Day of December, 1987

Attest:

DONALD J. QUIGG

Attesting Officer

Commissioner of Patents and Trademarks